(12) United States Patent
Cariccia et al.

(10) Patent No.: US 11,585,390 B2
(45) Date of Patent: Feb. 21, 2023

(54) FILTERING PULLEY ASSEMBLY FOR A BELT DRIVE

(71) Applicant: DAYCO EUROPE S.R.L., Chieti (IT)

(72) Inventors: Gianluca Cariccia, Chieti (IT); Andrea Guala, Chieti (IT); Gregorio Luciani, Chieti (IT); Ettore Gaude, Chieti (IT); Stefano Amadio, Chieti (IT); Daniele Esposto, Chieti (IT); Markus Armbrust, Chieti (IT); Marco Cipelli, Chieti (IT)

(73) Assignee: Dayco Europe S.R.L., Chieti (IT)

( * ) Notice: Subject to any disclaimer, the term of this patent is extended or adjusted under 35 U.S.C. 154(b) by 542 days.

(21) Appl. No.: 16/616,287

(22) PCT Filed: May 22, 2018

(86) PCT No.: PCT/IB2018/053616
§ 371 (c)(1),
(2) Date: Nov. 22, 2019

(87) PCT Pub. No.: WO2018/215933
PCT Pub. Date: Nov. 29, 2018

(65) Prior Publication Data
US 2020/0141451 A1 May 7, 2020

(30) Foreign Application Priority Data
May 22, 2017 (IT) .................. 102017000055345

(51) Int. Cl.
*F16D 7/08* (2006.01)
*F02B 67/06* (2006.01)
(Continued)

(52) U.S. Cl.
CPC ............. *F16D 7/08* (2013.01); *F02B 67/06* (2013.01); *F16D 3/12* (2013.01); *F16F 15/123* (2013.01);
(Continued)

(58) Field of Classification Search
CPC . F16H 2055/366; F16H 55/14; F16F 15/1297
(Continued)

(56) References Cited

U.S. PATENT DOCUMENTS 3,618,730 A * 11/1971 Mould, III ............ F16D 43/211
192/74
4,813,525 A * 3/1989 Rangert .................. B27B 17/10
192/105 BA
(Continued)

FOREIGN PATENT DOCUMENTS

JP 2003-269489 A 9/2003

OTHER PUBLICATIONS

CN, First Office Action, Chinese Application No. 2018800335779, Nov. 10, 2020 (7 pages).
(Continued)

*Primary Examiner* — Henry Y Liu
(74) *Attorney, Agent, or Firm* — FisherBroyles, LLP; Susan M. Oiler (57) ABSTRACT

A filtering pulley assembly for an accessory drive of a vehicle has a hub fixedly attachable to a rotating shaft, a pulley mounted coaxial and freely rotating on said hub, an actuator disc carried by the hub, a plurality of elastic assemblies interposed between the pulley and the actuator disc, and a torque limiting coupling configured to rotationally connect the actuator disc to the hub, when the torque is below a predetermined threshold value, and to decouple the actuator disc from the hub, when the torque is above the threshold value.

11 Claims, 7 Drawing Sheets

(51) Int. Cl.
  *F16D 3/12* (2006.01)
  *F16F 15/123* (2006.01)
  *F16H 55/36* (2006.01)
  *H02K 7/10* (2006.01)
  *F16H 55/49* (2006.01)

(52) U.S. Cl.
  CPC ............ F16H 55/36 (2013.01); H02K 7/1004 (2013.01); *F16H 55/49* (2013.01); *F16H 2055/366* (2013.01)

(58) Field of Classification Search
  USPC ...................................................... 474/70, 94
  See application file for complete search history.

(56) References Cited

U.S. PATENT DOCUMENTS

| | | | | |
|---|---|---|---|---|
| 6,044,943 A * | 4/2000 | Bytzek | ................... | F16D 41/20 192/55.2 |
| 7,712,592 B2 * | 5/2010 | Jansen | ................... | F16D 7/022 474/902 |
| 7,766,774 B2 * | 8/2010 | Antchak | ................. | F16D 7/022 474/74 |
| 7,891,475 B2 * | 2/2011 | Zhu | ....................... | F16F 15/129 192/55.61 |
| 7,954,613 B2 * | 6/2011 | Mevissen | ................ | F16D 13/12 192/55.61 |
| 8,202,183 B2 * | 6/2012 | Riu | ....................... | F16D 41/203 474/70 |
| 8,678,157 B2 * | 3/2014 | Ward | ...................... | F16D 7/022 474/94 |
| 8,813,928 B2 * | 8/2014 | Schneider | ............. | F16D 41/206 474/94 |
| 8,813,932 B2 * | 8/2014 | Ward | .................... | F16D 41/206 464/57 |
| 8,820,503 B2 * | 9/2014 | Schneider | ............. | F16D 41/206 474/94 |
| 8,888,619 B2 * | 11/2014 | Antchak | ............... | F16D 41/206 474/94 |
| 9,850,997 B2 * | 12/2017 | Cariccia | .............. | F16F 15/1216 |
| 2005/0230208 A1 * | 10/2005 | Ochiai | ...................... | F16D 7/08 192/3.23 |
| 2008/0280709 A1 * | 11/2008 | Gouadec | ................... | F16D 3/76 474/94 |
| 2011/0263365 A1 * | 10/2011 | Mende | ................ | F16F 15/1297 474/94 |
| 2014/0274506 A1 * | 9/2014 | Lannutti | ................. | F16H 55/36 474/70 |
| 2016/0138700 A1 * | 5/2016 | Hauck | ..................... | F16H 55/36 474/94 |
| 2016/0195182 A1 * | 7/2016 | Cariccia | ................. | F16H 55/36 474/94 |

OTHER PUBLICATIONS

CN, Search Report, Chinese Application No. 2018800335779, Nov. 10, 2020 (3 pages).
PCT, International Search Report and Written Opinion; International Application No. PCT/IB2018/053616 (13 pages).

* cited by examiner

FILTERING PULLEY ASSEMBLY FOR A BELT DRIVE

CROSS-REFERENCE TO RELATED APPLICATIONS

The present invention is filed under 35 U.S.C. § 371 as the U.S. National Phase of International Patent Application No. PCT/IB2018/053616, filed May 22, 2018, which designated the United States and which claims the benefit of Italian Patent Application No. 102017000055345, filed on May 5, 2017, the disclosure of which is incorporated by reference.

TECHNICAL FIELD

The present invention is relative to a filtering pulley assembly for a belt drive.

The preferred, but not exclusive, application of the invention is in accessory drives of internal combustion engines of motor vehicles, which will be referred to below for greater clarity by way of non-limiting example.

BACKGROUND ART

As is known, the drive shaft in internal combustion engines is subject to torsional vibrations due to the periodic stress caused by the combustion in the cylinders. Said vibrations are particularly intense at start-up and at low speeds.

The torsional vibrations result in rotation irregularities of the drive pulley of the accessory drive which are transmitted to the accessories by means of the drive belt, which is therefore subject to periodic variations in tension.

The accessories generally comprise an electric machine operating as an alternator and if necessary as a starter motor, and the compressor of the conditioning system. Overloads on the belt can be generated not only by the torsional vibrations of the drive shaft, but also by violent accelerations/decelerations of said drive shaft, due to the inertia of the accessories.

In order to "filter" the torsional oscillations transmitted by the drive shaft to the belt, a filtering pulley assembly is generally used as drive pulley provided with a hub integral with the drive shaft, a pulley cooperating with the belt and a filtering unit interposed between the hub and the pulley. The filtering unit can comprise one or more elastic elements via which the torque is transmitted from the hub to the pulley; said elastic elements can consist of spiral springs or helical springs arranged circumferentially.

Filtering pulley assemblies are also used to drive the electric machine, which is the accessory with the greatest inertia. Said pulley assembly comprises a hub adapted to be connected to the rotor of the electric machine, a pulley provided with a profile adapted to cooperate with the belt, and a filtering unit provided with one or more elastic elements interposed between the hub and the pulley.

In the conventional applications in which the electric machine consists of an alternator, it is known to incorporate in the filtering unit a free wheel adapted to unidirectionally transmit the movement from the pulley to the hub (normal operating condition) but to decouple the hub from the pulley in the event of inversion of the torque. The free wheel can be provided, for example, by means of a band spring carried either by the hub or the pulley and adapted to expand or contract according to the direction of the torque to cooperate with, or decouple from, a corresponding annular friction surface integral with the other between the hub and the pulley.

In the latest systems, the electric machine is increasingly frequently of reversible type, and is used, according to the operating conditions, as an alternator or motor (operating as a starter motor and/or booster). This makes it impossible to use a filtering unit with free wheel because it would decouple the electric machine, when used as a motor, from the belt drive.

DISCLOSURE OF INVENTION

The object of the present invention is to provide a filtering pulley assembly for a belt drive, which allows a relative rotation between hub and pulley in the two torque transmission directions, so as to substantially reduce the dynamic overloads on the belt.

The above-mentioned object is achieved by a filtering pulley that has a hub fixable to a rotating shaft, a pulley mounted coaxial and rotationally free on the hub, an actuator disc carried by the hub, a plurality of elastic assemblies interposed between the pulley and the actuator disc, and a torque limiting coupling that rotationally connects the actuator disc to the hub, when the torque is below a predetermined threshold value, and decouples the actuator disc form the hub, when the torque is above the threshold value.

BRIEF DESCRIPTION OF THE DRAWINGS

For a better understanding of the present invention, two preferred embodiments are described below, by way of non-limiting examples and with reference to the accompanying drawings, in which.

BEST MODE FOR CARRYING OUT THE INVENTION

Figure 1:
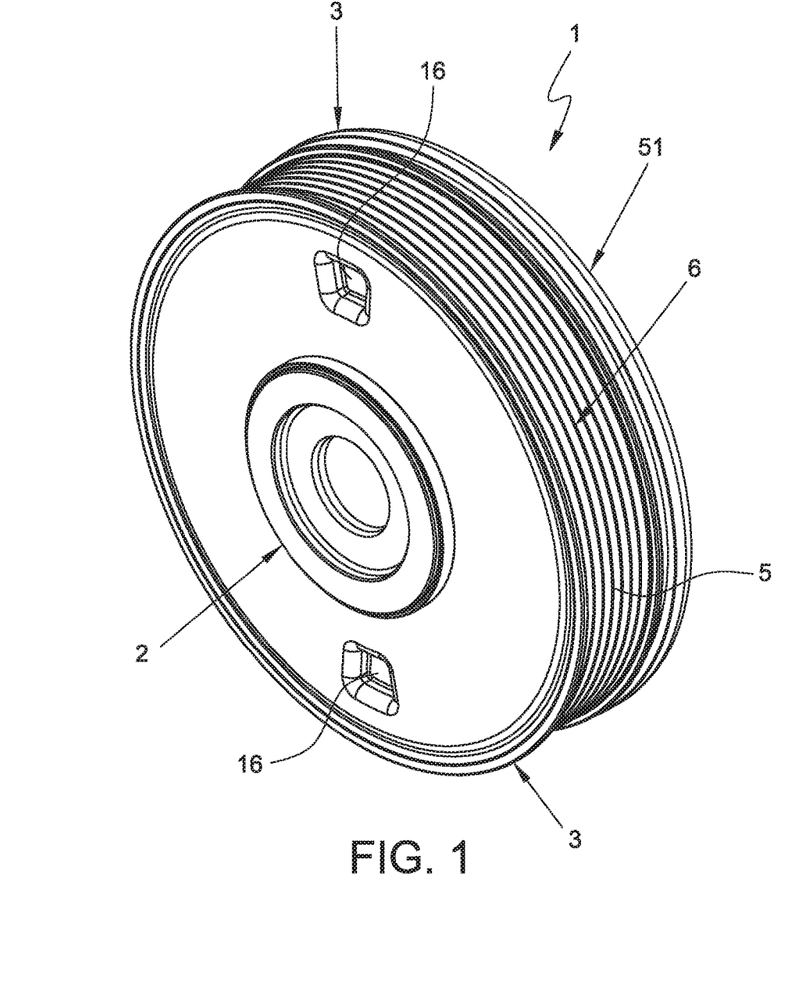
FIG. 1 is a perspective view of a filtering pulley assembly according to the invention adapted to be connected to a drive shaft.
Figure 2:
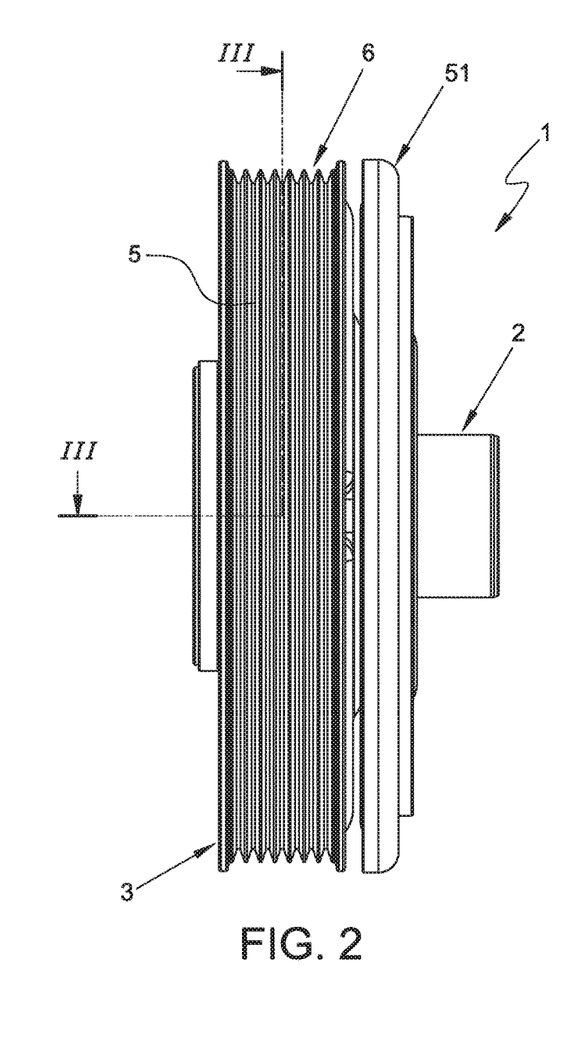
FIG. 2 is a lateral elevation view of the pulley assembly of FIG. 1.
Figure 3:
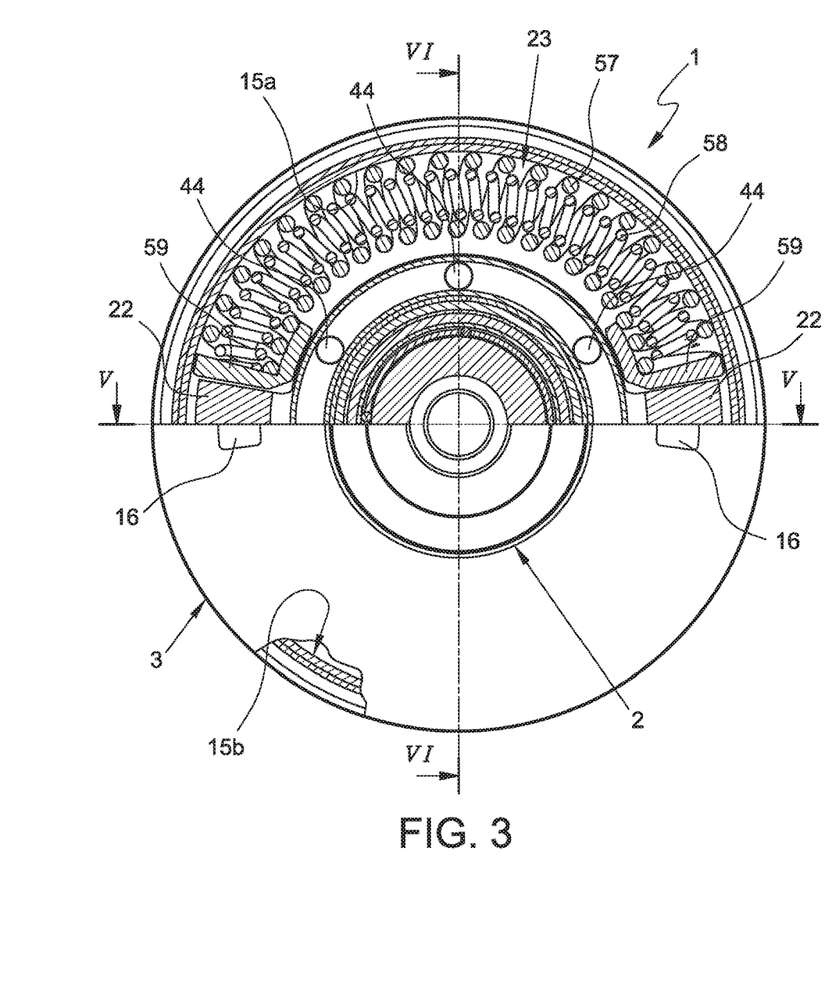
FIGS. 3 and 4 are views of the pulley assembly of FIG. 1, in front and perspective elevation respectively, partially sectioned along the line III-III.
Figure 4:
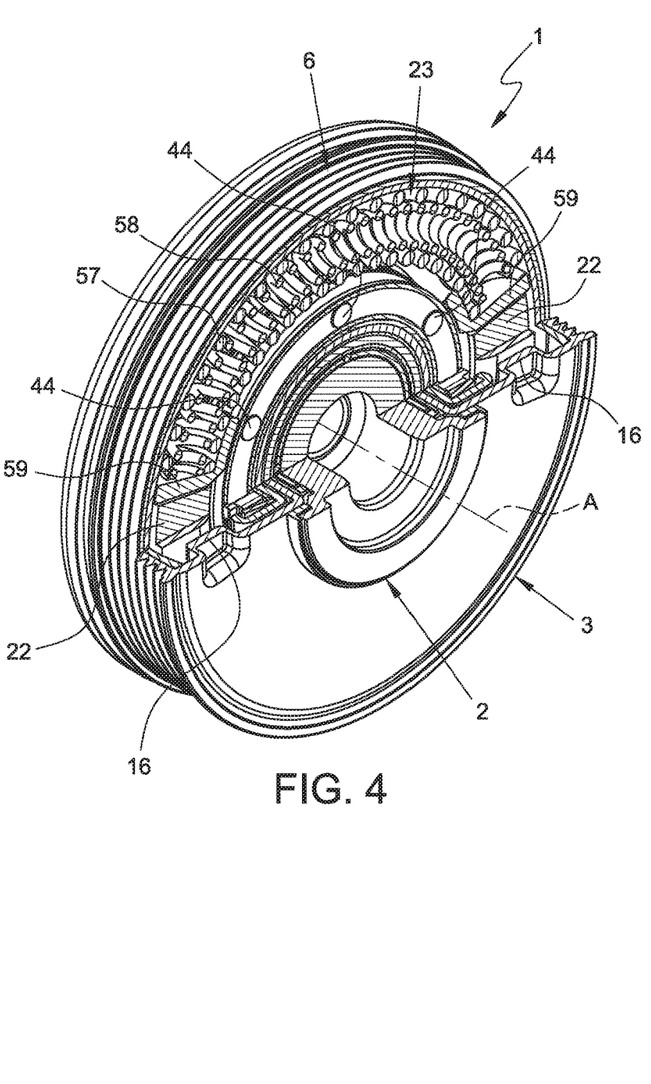
Figure 5:
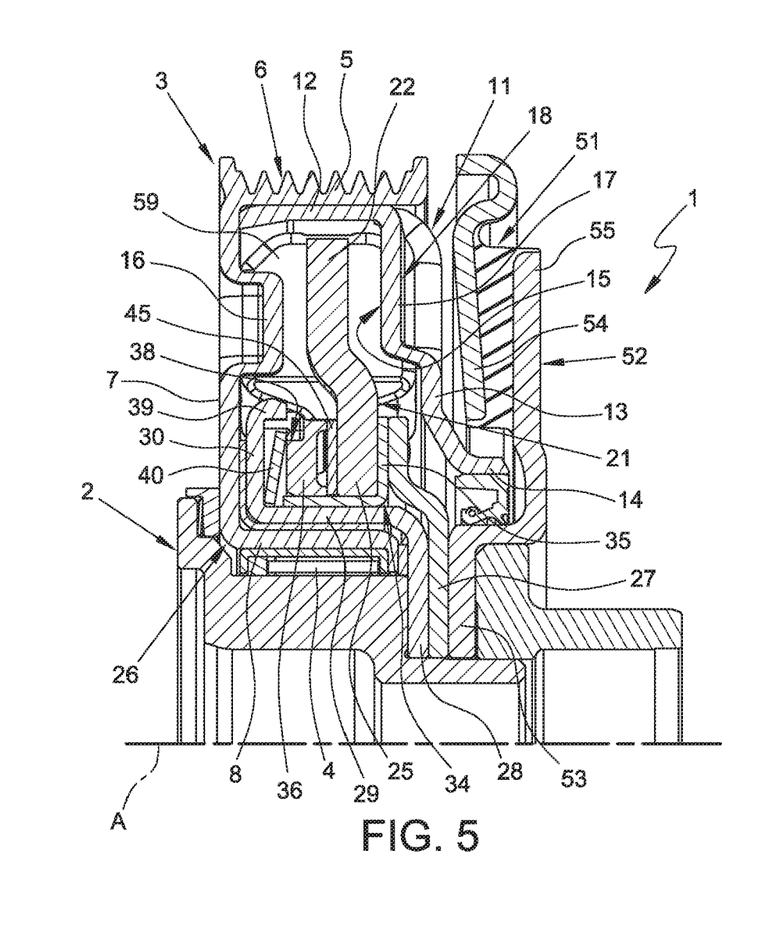
FIG. 5 is a section according to the line V-V of FIG. 3.
Figure 6:
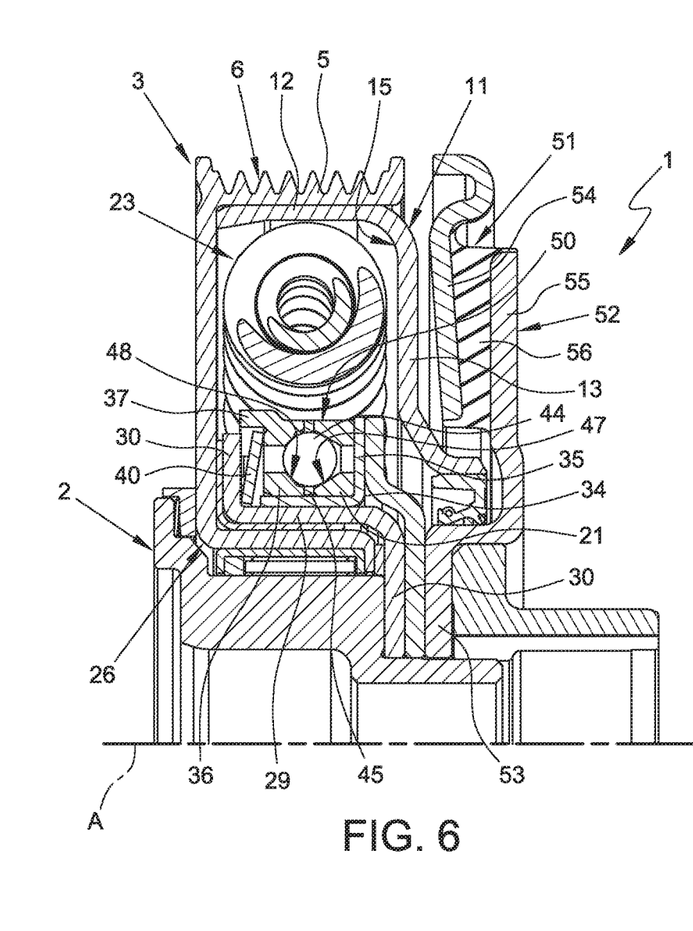
FIG. 6 is a section according to the line VI-VI of FIG. 3.

FIGS. 1 to 7 show a filtering pulley assembly 1 comprising a hub 2 having axis A adapted to be connected to a shaft (not shown), for example a crankshaft of an internal combustion engine, and an annular pulley 3 externally coaxial with the hub 2 and supported in a freely rotating manner on the hub 2 by means of a bearing 4, preferably a rolling bearing, for example a needle bearing (FIG. 5).

The pulley 3 comprises an annular crown 5 provided with a profile 6 adapted to cooperate with a poly-V belt (not shown). The pulley 3 further comprises a radial wall 7, integral with the annular crown 5 and preferably in one single piece therewith, extending radially towards the hub 2, and a substantially cylindrical inner wall 8, having axis A, internally coaxial with the annular crown 5.

The pulley 3 integrally carries a closing disc 11 comprising an outer cylindrical wall 12 having axis A, positioned inside the annular crown 5 of the pulley 3, a flat radial annular wall 13 facing the wall 7 of the pulley 3, and an inner cylindrical collar 14 having axis A, extending in a cantilever fashion the wall 13 on the opposite side of the cylindrical wall 12. The closing disc 11 forms with the pulley 3 an annular chamber 15 radially included between the wall 12 and the wall 8 and delimited axially by the wall 7 and the wall 13.

Lastly, the pulley 3 comprises two diametrically opposite projections 16 axially extending inside the chamber 15 from the wall 7 (FIG. 5).

Similarly, the closing disc 11 has two projections 17 diametrically opposite each other, axially extending inside the chamber 15 from the wall 13, facing the projections 16 and axially spaced with respect thereto.

The projections 16 and 17 jointly define diametrically opposite stops 18, which divide the chamber 15 into two portions 15a, 15b of equal dimensions.

The chamber 15 houses a filtering unit 20 essentially comprising an actuator disc 21 having axis A provided with a pair of outer radial spokes 22 diametrically opposite each other, and a pair of elastic assemblies 23 arranged between the spokes 22 and the stops 18 as will be clarified below.

The actuator disc 21 (FIG. 5) has its own inner annular edge 25 mounted angularly free between a bell element 26 and a flange 27 integral with the hub 2. In particular, the bell element 26 is shaped so as to form an inner flat annular wall 28 mounted on the hub 2, an intermediate cylindrical wall 29 externally coaxial to the wall 8 of the pulley 3 and a flange 30 axially facing an outer edge 28 of the flange 27.

The actuator disc 21 is mounted on a bushing 34 made of low friction material fitted on the intermediate cylindrical wall of the bell element 26 and forming a flat annular collar 35 axially interposed between the actuator disc 21 and the flange 27.

The actuator disc 21 rotates inside the chamber 15; the axial space between the projections 16 and 17 allows passage of the spokes 22 of the actuator disc 21.

The filtering unit 20 further comprises a driving ring 36 mounted axially sliding on the bushing 34 in a position axially facing the inner annular edge 25 of the actuator disc 21.

The driving ring 36 (FIGS. 5 to 7) has an outer annular projection 37 axially extending on the opposite side of the actuator disc 21 and having a plurality of recesses 38 angularly equispaced between one another. The recesses 38 are engaged by respective axial teeth 39 (FIGS. 5 and 7) carried by the flange 30 of the bell element 26, so as to prismatically couple the bell element 26 to the driving ring 36.

Preload means are advantageously axially interposed between the flange 30 of the bell element 26 and the driving ring 36, for example a disc spring 40 having the purpose of axially pushing the driving ring 36 towards the actuator disc 21.

A plurality of balls 44 are axially interposed between the driving disc 36 and the actuator disc 21, carried in an angularly equispaced position by a cage 45 in the form of a flat ring provided with holes 46 for housing the balls 44. The cage 45 is arranged in axial abutment against the actuator disc 21. The balls 44 are housed not only in the respective holes 46 but are also partially and stably housed in respective front seats 47 (FIG. 6), preferably having conical shape and obtained in the ring in the actuator disc 21, and cooperate with respective front seats 48, preferably having a conical shape and obtained in the driving ring 36.

The balls 44 form with the actuator disc 21 and the driving ring 36 a torque limiting coupling indicated overall by 50.

The opening angle of the seats 48 (i.e. the angle formed by a generatrix of each seat with the axis of the seat itself) is chosen in relation to the rigidity of the disc spring 40, so as to define a torque threshold value that can be transmitted by the coupling 50, as will be better described below.

The pulley 1 is further provided with a dynamic damper 51 comprising a disc 52 facing the closing element 11 and having a hub portion 53 integral with the hub 2, and a seismic ring 54 constrained to a perimeter portion 55 of the disc 52 by a ring 56 made of elastomeric material.

The pulley 1 can further comprise a dust lip seal 26 between the collar 14 of the closing element 11 and the hub portion 53 of the damper 52.

Figure 7:
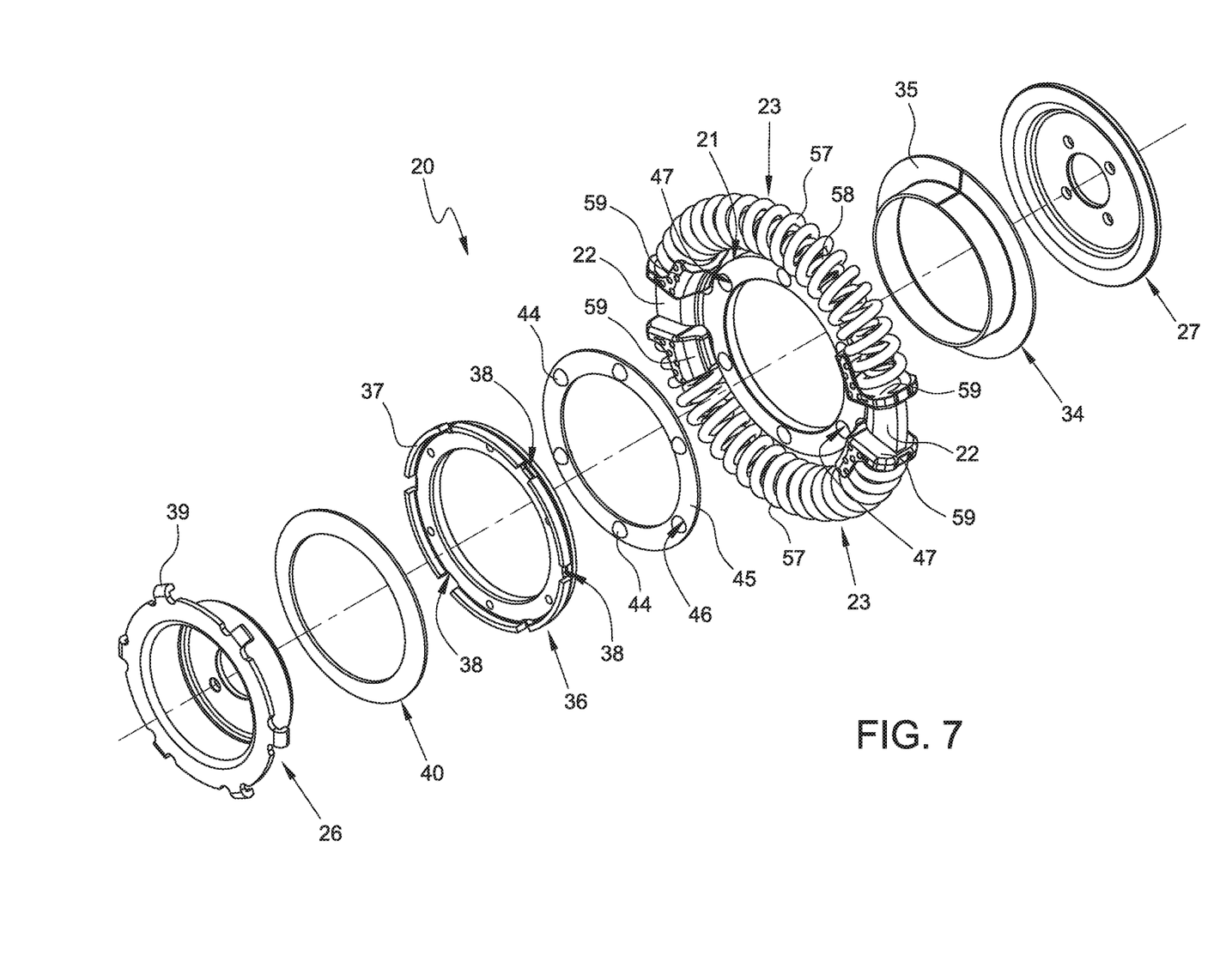
FIG. 7 is an exploded perspective view of a filtering unit of the pulley assembly of the preceding figures.
Figures 8, 9:
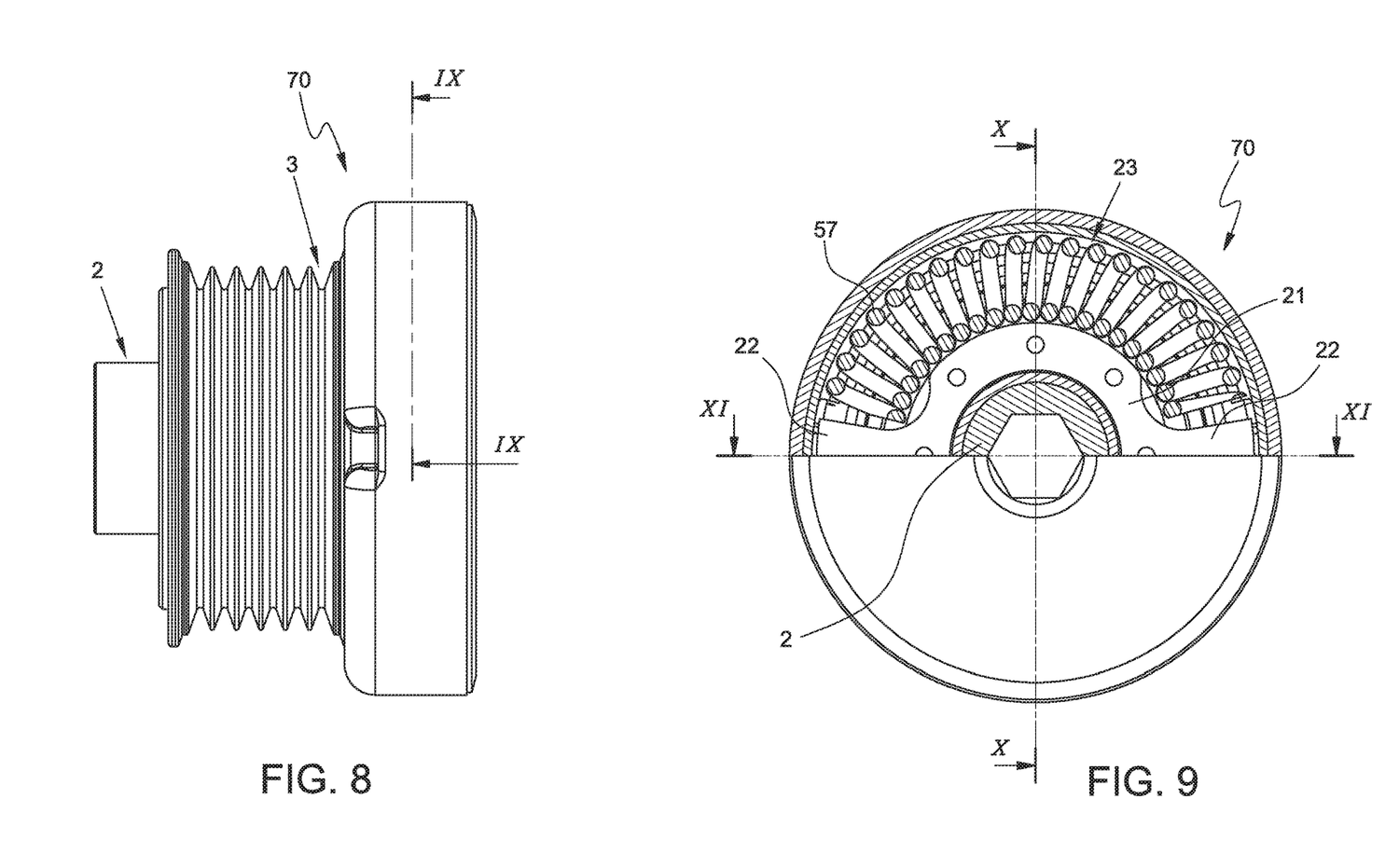
FIG. 8 is a lateral elevation view of a filtering pulley assembly according to the invention adapted to be connected to an electric machine; +ù++
FIG. 9 is a front view of the pulley assembly of FIG. 8, in partial section along the line IX-IX of FIG. 8.
Figure 10:
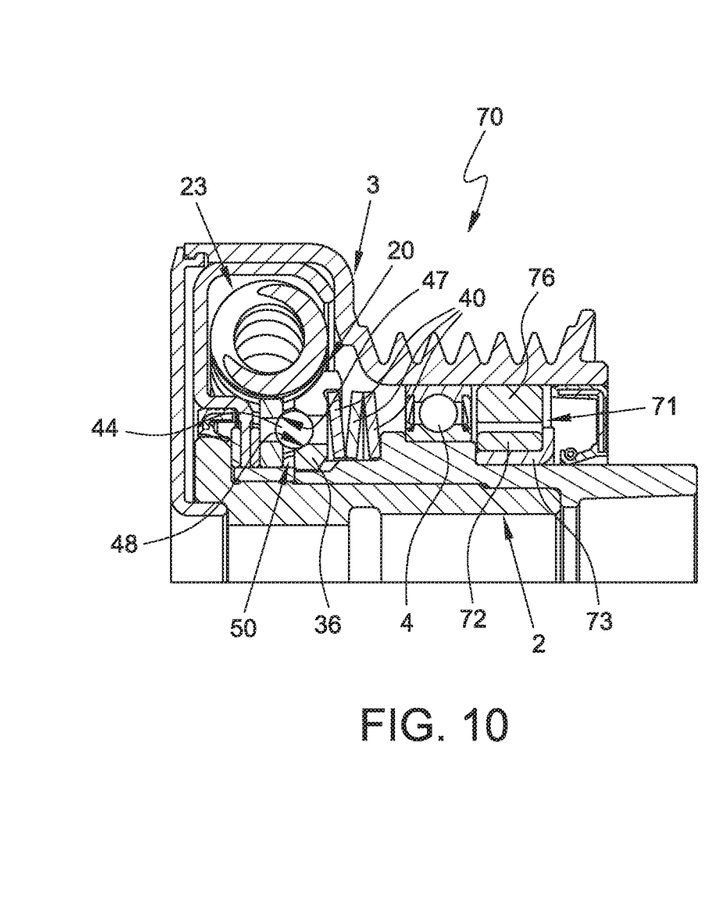
FIG. 10 is a section according to the line X-X of FIG. 9.
Figure 11:
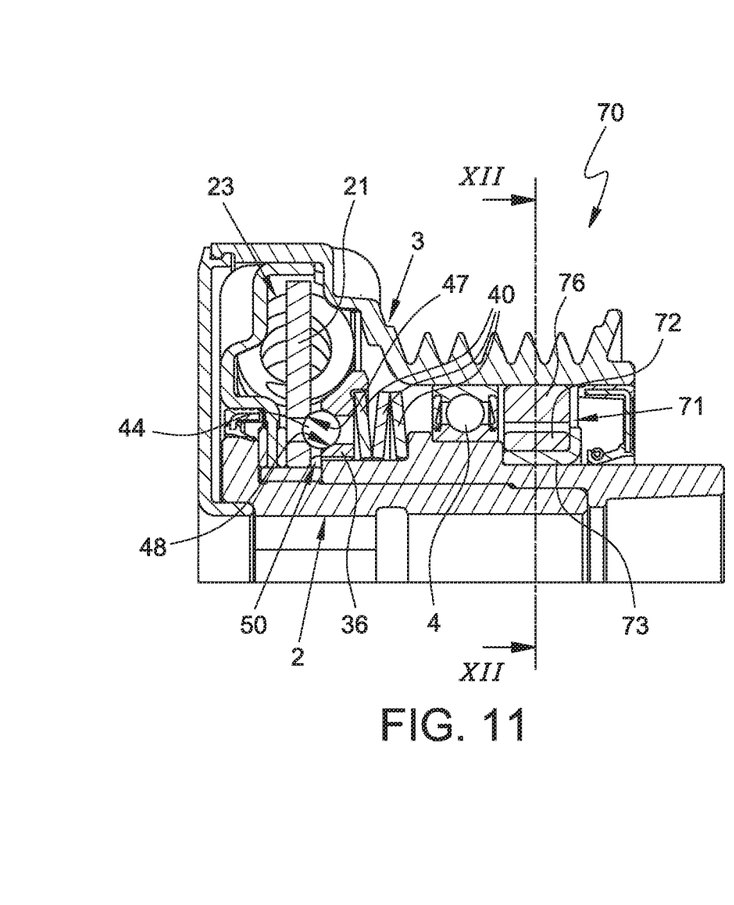
FIG. 11 is a section according to the line XI-XI of FIG. 9.
Figure 12:
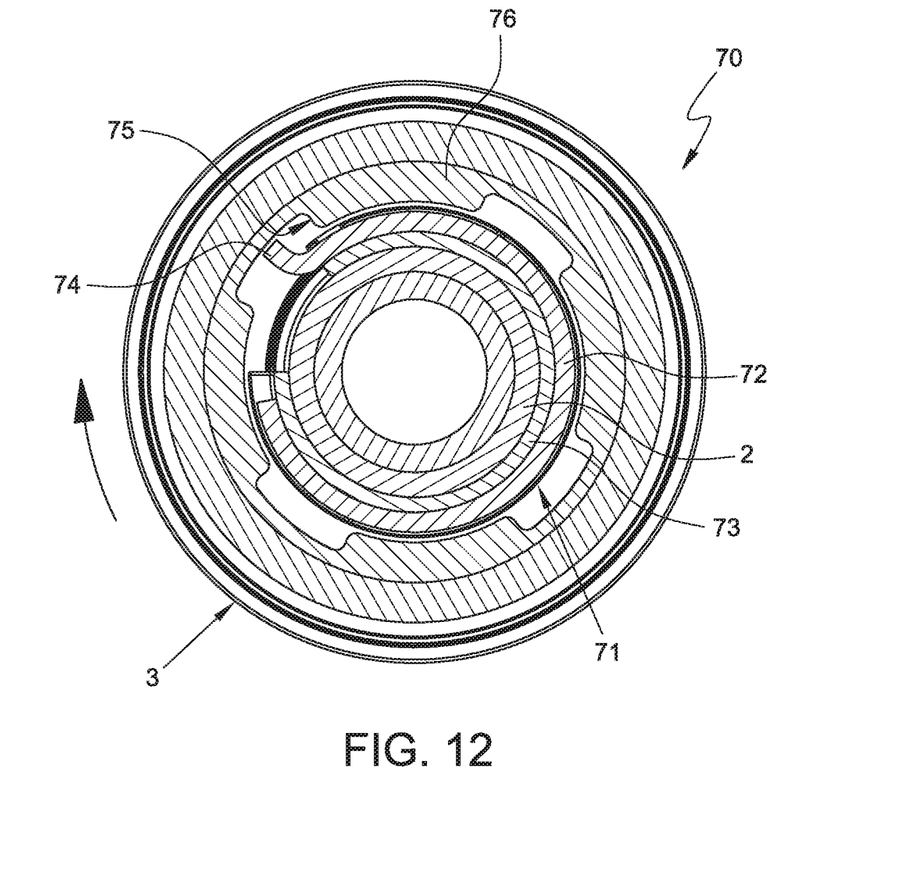
FIG. 12 is a section according to the line XII-XII of FIG. 11.

As better illustrated in FIGS. 3, 4 and 7, the elastic assemblies 23 comprise respective pairs of helical springs 57, 58 arranged coaxial to each other circumferentially within the respective portions 15a, 15b of the chamber 15. More specifically, each elastic assembly comprises an external spring 57, an internal spring 58, and a pair of end sliding blocks 59 made of plastic material applied on the ends of the springs 57 and adapted to avoid direct contact between the ends of the springs 57, 58 and the stops 18 or the spokes 22 of the actuator disc 21.

Operation of the assembly 1 is as follows.

In the absence of torque, the actuator disc 21 is made integral with the hub 2 (and therefore with the drive shaft) by means of the coupling 50. The elastic assemblies 23 are undeformed and, theoretically if they do not have (circumferential) axial play within the respective portions 15a, 15b of the chamber 15, they maintain the actuator disc 21 in the angular position in which the spokes 22 are aligned with the stops 18 (FIGS. 3, 4).

The torque is transmitted from the hub 2 to the actuator disc 21 via the torque limiting coupling 50 until the coupling threshold value is reached. In this functioning mode, which occurs in normal operating conditions, the balls 44 of the coupling 50 are housed in the seats 47 of the actuator disc 21 and engaged in the seats 48 of the driving ring, since the axial component of the forces transmitted from the balls 44 to the driving ring 36 is inferior to the elastic reaction of the disc spring 40.

As the torque increases, and up to said threshold value, the actuator disc 21 rotates with respect to the pulley 3 since the torque is transmitted by the spokes 22 of the actuator disc 21 to the stops 18 of the pulley 3 via the elastic assemblies 23, which are compressed. The torsional oscillations are filtered by the elastic assemblies 23.

If torque values higher than the above-mentioned threshold value occur, which can happen for example during start-up or following sudden transients, the axial component of the forces transmitted by the balls 44 to the driving ring 36 overcomes the elastic reaction of the disc spring 40. The driving ring 36 therefore moves away from the actuator disc 21 and the balls 44 come out of the seats 48, decoupling the actuator disc 21 from the hub 2.

The decoupling is obviously temporary, and the coupling 50 restores transmission of the torque as soon as the latter returns to values below the threshold value.

In this way, impact is avoided; the sizing of the assembly can consequently be lighter and more compact.

Furthermore, since the decoupling depends on a balance of forces and not, for example, on the relative sliding between friction surfaces, the threshold value can be accurately determined and operation is reliable.

FIGS. 8 to 12 illustrate a second embodiment of the present invention, consisting of a pulley assembly 70 for driving an electric machine of an accessory drive of a motor vehicle. The assembly 70 is described summarily with regard to the aspects that differ from previously described assembly 1, using the same reference numbers to identify parts identical or corresponding to parts already described.

The pulley assembly 70 comprises a hub 2, a pulley 3 supported on the hub by means of a bearing 4 and a filtering unit 20 comprising an actuator disc 21 provided with spokes 22 and a pair of elastic assemblies 23, in this case comprising one single spring 57 arranged circumferentially between respective diametrically opposite stops 18.

The actuator disc 21 can be selectively coupled to the hub 2 by means of a torque limiting coupling 50 comprising a driving ring 36 prismatically coupled to the hub 2 and a plurality of balls 44 axially interposed between the actuator disc 21 and the driving ring 36.

The balls 44 are partially housed in seats 48 obtained in the driving ring 36 and selectively cooperate with seats 47 obtained on the actuator disc 21. The driving ring 36 is axially sliding and is subject to the elastic thrust of a plurality of disc springs 40 in series with one another.

Lastly, the assembly 70 comprises a damping device 71 (FIGS. 10-12) comprising a C-shaped spring 72 which envelops the hub 2 and elastically tightens on the hub a bushing 73 made of plastic material, also open in a C shape. The spring 72 has an end curl 74 folded outwards and engaging with play an inner groove 75 of a ring 76 positioned inside the pulley 3.

Operation of the assembly 70 is evident to a person skilled in the art according to the description of assembly 1.

In this case, in normal operating conditions, the torque is transmitted from the pulley 3 to the hub 2, and the coupling 50 is designed so that when the threshold value of the transmittable torque is exceeded, the balls 44 disengage from the actuator disc 21 (instead of from the driving ring 36).

The damping device 70 is not active for small oscillations in amplitude less than the angular clearance between the curl 74 and the groove 75, so as to maximize the filtering action of the elastic assemblies 23.

The assembly 70 is activated when the relative rotation between hub 2 and pulley 3 is of amplitude sufficient to bring the curl 74 into contact with one of the sides of the groove.

Furthermore, the damping device 70 generates an asymmetric damping according to the direction of relative rotation. With reference to the direction of rotation indicated in FIG. 12, if the pulley 3 tends to surpass the hub 2 (normal operation) the interaction between the curl 74 and the ring 76 integral with the pulley 3 is such as to "open" the spring 73 and reduce the damping torque; vice versa, if the pulley 3 tends to be surpassed by the hub 2 due to the inertia of the electric machine following a sudden deceleration of the drive shaft, the interaction between the curl 74 and the ring 76 integral with the pulley 3 is such as to "close" the spring 73 and increase the damping torque.

Modifications and variations can be made to the pulley assemblies 1, 70 described without departing from the protective scope defined by the claims.

In particular, the elastic assemblies 23 can have an angular play in the respective portions 15*a*, 15*b* of the chamber 15, so as to define a free rotation angle between the hub 2 and the pulley 3 within which they do not intervene.

The elastic assemblies 23 can comprise two springs coaxial to each other or one single spring, or the cage 45 can be omitted.

Again, other preload means could be used, for example magnetic or pneumatic, or the seats 47, 48 could have a different form, for example they could be in the form of a cam.

The invention claimed is:

1. A filtering pulley assembly for an accessory drive of a vehicle, comprising:
   a hub adapted to be fixed to a rotating shaft,
   a pulley mounted coaxial and freely rotating on said hub,
   an actuator disc carried by the hub,
   a plurality of elastic assemblies interposed between the pulley and the actuator disk,
   a torque limiting coupling configured to rotationally connect the actuator disc to the hub, when the torque is below a predetermined threshold value, and to decouple the actuator disc from the hub, when the torque is above the threshold value, and
   a damping assembly for damping the relative oscillations between the hub and pulley,
   wherein said damping assembly defines different damping values depending on the direction of relative rotation between the hub and the pulley.

2. The pulley assembly according to claim 1, wherein the torque limiting coupling comprises a driving element prismatically coupled to said hub, a plurality of rolling bodies interposed between the driving element and the actuator disc, and at least one preload means tending to maintain the rolling bodies engaged with the driving element and with the actuator disc, at least one said preload means allowing disengagement of the rolling bodies from either the driving element or the actuator disc when said threshold value is exceeded.

3. The pulley assembly as according to claim 1, wherein the rolling bodies are balls interposed axially between the driving element and the actuator disc.

4. The pulley assembly according to claim 3, wherein said balls are partially housed in first seats in one of either said actuator disc and said driving element and cooperate with second seats in the other of said actuator disc and said driving element, at least said second seats being shaped so as to exchange a force with said balls, depending on the value of the torque transmitted.

5. The pulley assembly according to claim 4, wherein at, least, said second seats are conical.

6. The pulley assembly according to claim 3, wherein said balls are carried by a cage.

7. The pulley assembly according to claim 3, wherein said driving element is a ring arranged facing the actuator disc and axially movable with respect to the hub, and in that said at least one preload means acts on the driving element to push it towards the actuator disc.

8. The pulley assembly according to claim 1, wherein said damping assembly is active for oscillations of amplitude greater than a predefined threshold value.

9. An accessory drive of a motor vehicle, comprising a pulley assembly as claimed in claim 1.

10. The drive according to claim 9, wherein the huh of the pulley assembly is connected to the drive shaft of the accessory drive.

11. The drive according to claim 9, wherein the hub of the pulley assembly is connected to a shaft of an electric machine.

\* \* \* \* \*